United States Patent
Agrawal

(10) Patent No.: US 11,438,390 B2
(45) Date of Patent: Sep. 6, 2022

(54) AUTOMATIC CALL FORWARDING DURING SYSTEM UPDATES

(71) Applicant: Motorola Mobility LLC, Chicago, IL (US)

(72) Inventor: Amit Kumar Agrawal, Bangalore (IN)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 15/833,297

(22) Filed: Dec. 6, 2017

(65) Prior Publication Data
US 2018/0191789 A1      Jul. 5, 2018

(30) Foreign Application Priority Data
Dec. 30, 2016   (IN) .............................. 201631045112

(51) Int. Cl.
*H04L 65/1096* (2022.01)
*H04W 4/16* (2009.01)
*G06F 8/65* (2018.01)

(52) U.S. Cl.
CPC ............ *H04L 65/1096* (2013.01); *G06F 8/65* (2013.01); *H04W 4/16* (2013.01)

(58) Field of Classification Search
CPC ......... G06F 8/65; H04L 65/1096; H04W 4/16
See application file for complete search history.

(56) References Cited

U.S. PATENT DOCUMENTS

| | | | | |
|---|---|---|---|---|
| 5,594,782 A * | 1/1997 | Zicker | ................... | H04W 48/18 455/433 |
| 5,724,417 A * | 3/1998 | Bartholomew | ........ | H04Q 3/627 455/73 |
| 5,862,475 A * | 1/1999 | Zicker | ................... | H04W 8/205 455/552.1 |
| 6,130,938 A * | 10/2000 | Erb | ......................... | H04M 3/46 379/142.01 |
| 6,631,186 B1 * | 10/2003 | Adams | .................. | H04M 3/537 379/201.12 |
| 6,757,704 B1 * | 6/2004 | Denker | ............... | H04L 65/1101 370/352 |
| 7,327,838 B2 * | 2/2008 | Smith | ..................... | H04M 3/54 379/207.05 |
| 7,633,388 B2 * | 12/2009 | Simon | .................. | G08B 25/009 340/5.2 |
| 7,693,132 B1 * | 4/2010 | Cooper | ............... | H04L 12/1836 370/352 |

(Continued)

*Primary Examiner* — Khaled M Kassim
*Assistant Examiner* — Berhanu D Belete

(57) ABSTRACT

A method includes identifying a system update for a first device. A forwarding command is sent from the first device to a service provider that provides communications services for the first device responsive to identifying the system update. The forwarding command specifies a second device. The system update is executed after sending the forwarding command. A first device includes a transceiver for receiving incoming communications and a processor. The processor is to identify a system update for the first device, send a forwarding command from the first device to a service provider that provides communication services for the first device responsive to identifying the system update, wherein the forwarding command specifies a second device, and execute the system update after sending the forwarding command.

20 Claims, 4 Drawing Sheets

(56) References Cited

U.S. PATENT DOCUMENTS

| | | | | |
|---|---|---|---|---|
| 7,769,392 B2* | 8/2010 | Russell | | H04M 3/54 379/212.01 |
| 7,962,675 B1* | 6/2011 | Graham, III | | H04L 41/082 710/62 |
| 8,050,917 B2* | 11/2011 | Caspi | | G10L 17/00 704/238 |
| 8,069,252 B2* | 11/2011 | Janning | | H04L 65/401 709/219 |
| 8,423,010 B1* | 4/2013 | Lee | | H04M 3/548 455/420 |
| 8,819,374 B1* | 8/2014 | Don | | G06F 3/0647 711/112 |
| 8,825,836 B1* | 9/2014 | Gibson | | H04L 51/24 455/412.2 |
| 2002/0087502 A1* | 7/2002 | Nagy | | H04M 15/41 |
| 2002/0138603 A1* | 9/2002 | Robohm | | H04M 15/47 709/223 |
| 2002/0147811 A1* | 10/2002 | Schwartz | | G06Q 10/02 709/225 |
| 2005/0026649 A1* | 2/2005 | Zicker | | H04M 3/42246 455/552.1 |
| 2005/0058269 A1* | 3/2005 | Watts | | H04Q 3/0045 379/211.02 |
| 2005/0130639 A1* | 6/2005 | Smith | | H04M 3/54 455/417 |
| 2005/0157859 A1* | 7/2005 | Rodriguez | | H04M 3/54 379/142.01 |
| 2006/0135138 A1* | 6/2006 | Lazaridis | | H04M 3/54 455/417 |
| 2007/0019634 A1* | 1/2007 | Fisher | | H04M 7/006 370/352 |
| 2007/0086579 A1* | 4/2007 | Lorello | | H04M 3/42263 379/45 |
| 2008/0039208 A1* | 2/2008 | Abrink | | A63F 13/12 463/42 |
| 2008/0200192 A1* | 8/2008 | Harris | | H04W 4/14 455/466 |
| 2008/0273678 A1* | 11/2008 | Balk | | H04M 7/0033 379/93.23 |
| 2008/0273679 A1* | 11/2008 | Russell | | H04L 12/14 379/114.28 |
| 2008/0301175 A1* | 12/2008 | Applebaum | | G06F 16/24565 707/999.102 |
| 2009/0113452 A1* | 4/2009 | Grigsby | | H04L 51/043 719/318 |
| 2009/0213862 A1* | 8/2009 | Zhang | | H04L 45/00 370/401 |
| 2010/0067668 A1* | 3/2010 | Tasker | | H04M 3/533 379/88.17 |
| 2010/0083243 A1* | 4/2010 | Mincarelli | | G06F 8/61 717/173 |
| 2010/0285843 A1* | 11/2010 | Appelman | | H04W 4/12 455/566 |
| 2010/0303063 A1* | 12/2010 | Gibson | | H04M 3/42153 370/352 |
| 2010/0310057 A1* | 12/2010 | Theppasandra | | H04M 3/548 379/88.04 |
| 2011/0173598 A1* | 7/2011 | Cassapakis | | G06F 8/654 717/168 |
| 2011/0274051 A1* | 11/2011 | Vikberg | | H04W 8/18 370/328 |
| 2011/0282836 A1* | 11/2011 | Erickson | | G06F 16/27 707/622 |
| 2012/0115451 A1* | 5/2012 | Roka | | H04W 4/16 455/417 |
| 2012/0142380 A1* | 6/2012 | Chang | | H04W 4/16 455/466 |
| 2013/0055242 A1* | 2/2013 | Tsirkin | | H04L 63/20 718/1 |
| 2013/0086162 A1* | 4/2013 | Smith | | H04L 12/6418 709/204 |
| 2014/0109076 A1* | 4/2014 | Boone | | H04L 63/0823 717/170 |
| 2014/0143049 A1* | 5/2014 | Gilberd | | G06Q 30/0255 705/14.53 |
| 2014/0162692 A1* | 6/2014 | Li | | H04L 67/133 455/456.3 |
| 2014/0187327 A1* | 7/2014 | Abrink | | G07F 17/32 463/31 |
| 2014/0223423 A1* | 8/2014 | Alsina | | H04L 67/34 717/173 |
| 2014/0324700 A1* | 10/2014 | Zhang | | G06Q 20/0855 705/44 |
| 2014/0337611 A1* | 11/2014 | Kuscher | | G06F 8/65 348/14.07 |
| 2014/0351096 A1* | 11/2014 | Radziwon | | G06Q 30/0645 705/26.81 |
| 2015/0004955 A1* | 1/2015 | Li | | H04W 8/22 455/418 |
| 2015/0007163 A1* | 1/2015 | Goldberg | | G06F 8/65 717/172 |
| 2015/0120438 A1* | 4/2015 | Gilberd | | G06Q 30/0255 705/14.45 |
| 2015/0145669 A1* | 5/2015 | Faaborg | | H04L 51/42 340/527 |
| 2015/0156616 A1* | 6/2015 | McComb | | H04M 3/42068 455/417 |
| 2015/0199667 A1* | 7/2015 | Fernando | | G06Q 20/202 705/21 |
| 2015/0199668 A1* | 7/2015 | Fernando | | G06Q 20/20 705/16 |
| 2015/0199882 A1* | 7/2015 | Fernando | | G07G 1/0018 345/173 |
| 2015/0230070 A1* | 8/2015 | Kadiyala | | H04W 72/02 455/552.1 |
| 2015/0245186 A1* | 8/2015 | Park | | H04W 4/16 455/417 |
| 2015/0256446 A1* | 9/2015 | Doi | | H04L 45/14 709/203 |
| 2015/0271335 A1* | 9/2015 | Tasker | | H04M 3/533 379/88.17 |
| 2015/0350418 A1* | 12/2015 | Rauenbuehler | | H04M 1/724 455/414.1 |
| 2015/0350807 A1* | 12/2015 | Andrews | | G06F 8/65 455/414.2 |
| 2015/0358206 A1* | 12/2015 | Cudak | | H04L 67/10 709/223 |
| 2015/0365520 A1* | 12/2015 | Bennett | | H04M 1/72484 455/417 |
| 2016/0005020 A1* | 1/2016 | Fernando | | G06Q 20/202 705/21 |
| 2016/0043984 A1* | 2/2016 | Kenna | | H04L 51/24 709/206 |
| 2016/0050144 A1* | 2/2016 | Gavade | | H04L 41/0813 370/392 |
| 2016/0084933 A1* | 3/2016 | James | | H04W 4/02 342/450 |
| 2016/0105698 A1* | 4/2016 | Tang | | H04N 21/4627 725/25 |
| 2016/0135022 A1* | 5/2016 | Fan | | H04W 4/24 455/466 |
| 2017/0168805 A1* | 6/2017 | Yin | | G06F 8/65 |
| 2017/0220334 A1* | 8/2017 | Hart | | G06F 8/65 |
| 2017/0262891 A1* | 9/2017 | Green | | H04M 3/42059 |
| 2017/0337900 A1* | 11/2017 | Dai | | H04L 67/12 |
| 2017/0339189 A1* | 11/2017 | Leong | | H04W 76/14 |
| 2018/0063259 A1* | 3/2018 | Connelly | | H04L 67/306 |

* cited by examiner

AUTOMATIC CALL FORWARDING DURING SYSTEM UPDATES

BACKGROUND

Field of the Disclosure

The disclosed subject matter relates generally to mobile computing systems and, more particularly, to automatically forward calls to a device during a system update.

Description of the Related Art

Many individuals employ mobile devices as their primary contact sources. The operating systems and application programs for such devices are constantly being updated to provide enhanced functionality or address software security or stability issues. In some cases, the user may allow the updates to be automatically "pushed" to the device and a system update may be performed without user interaction. These system updates may be frequent, especially for beta testers, and may take an appreciable amount of time to complete (e.g., 10-20 minutes). Due to the frequency and length of system updates, there may be significant time periods where a user is unreachable via the mobile device.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF EMBODIMENT(S)

FIGS. 1-4 illustrate example techniques for automatically forward calls to a device during a system update. In one example, a mobile device may detect that a system update is pending and automatically initiate call forwarding for the mobile device during the installation of the system update. In some embodiments, a target device for the call forwarding may be determined by the device based on user preferences, proximity of other devices, or a user query.

Figure 1:
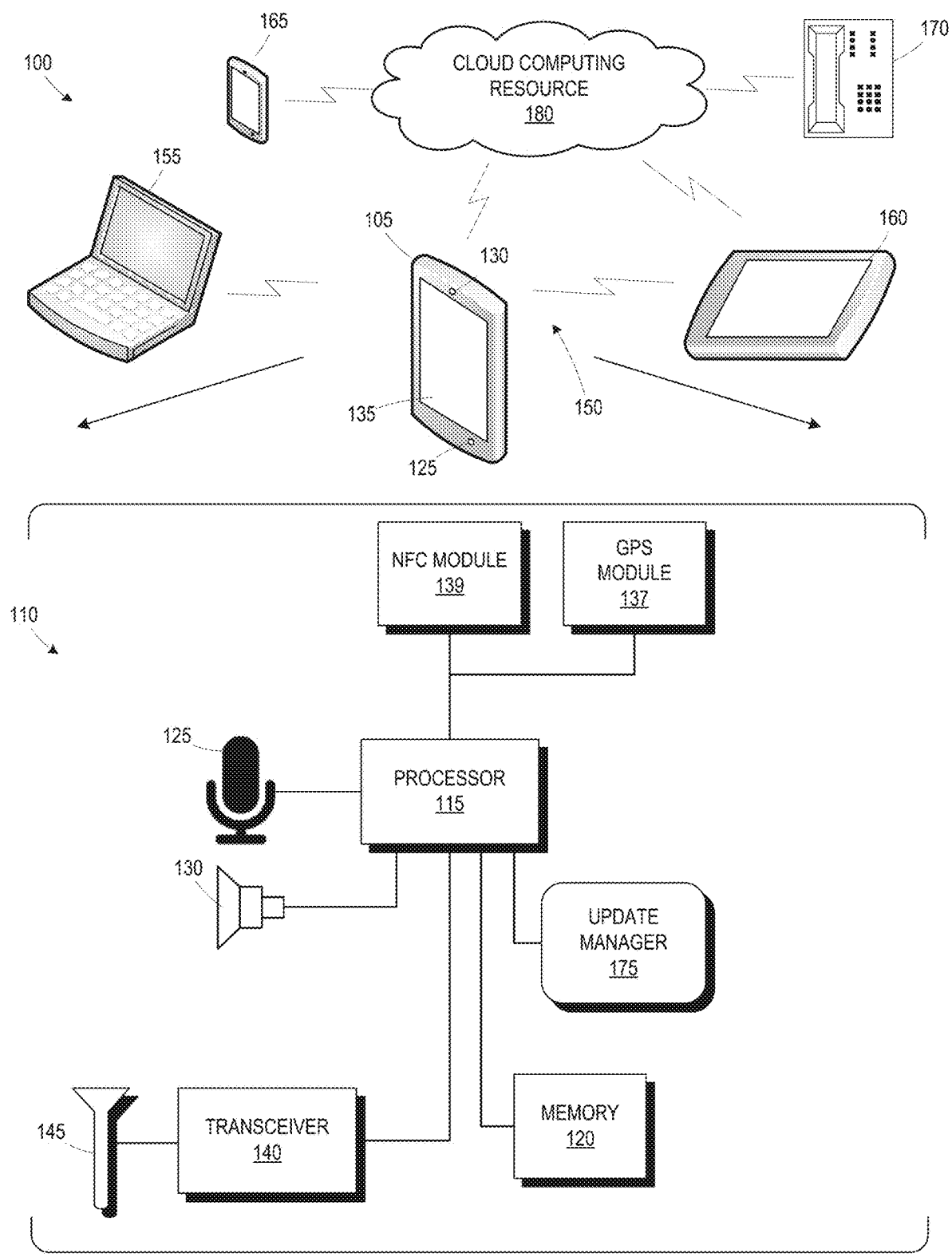
FIG. 1 is a simplified block diagram of a communication device configured to automatically forward calls to a device during a system update, in accordance with some embodiments.

FIG. 1 is a simplistic block diagram of a communications system 100 including a first device 105. The first device 105 implements a computing system 110 including, among other things, a processor 115, a memory 120, a microphone 125, a speaker 130, a display 135, a GPS module 137, and a near field communication (NFC) module 139. The memory 120 may be a volatile memory (e.g., DRAM, SRAM) or a non-volatile memory (e.g., ROM, flash memory, hard disk, etc.). The first device 105 includes a transceiver 140 for transmitting and receiving signals via an antenna 145 over a communication link 150. The transceiver 140 may include one or more radios for communicating according to different radio access technologies, such as cellular, Wi-Fi, Bluetooth®, etc. The communication link 150 may have a variety of forms. In some embodiments, the communication link 150 may be a wireless radio or cellular radio link. The communication link 150 may also communicate over a packet-based communication network, such as the Internet.

As illustrated in FIG. 1, the first device 105 may be one of a plurality of connected devices 105, 155, 160, 165, 170. The other connected devices 155, 160, 165, 170 may also include a computing system having some or all of the entities in the computing system 110 of the first device 105, such as a processor, a memory, and a transceiver. Any number of connected devices of different types may be included when using the method and systems disclosed herein. In various embodiments, the devices 105, 155, 160, 165, 170 may be embodied in handheld or wearable devices, such as a laptop computers, handheld computers, tablet computers, mobile devices, telephones, personal data assistants, music players, game devices, wearable computing devices, and the like. One or more of the connected devices 155, 160 could also be a non-portable device, such as a desktop computer. For example, the device 155 may be a laptop computer, the device 160 may be a tablet computer, the device 165 may be a mobile telephone, and the device 170 may be a telephone (e.g., VOIP or POTS). To the extent certain example aspects of the devices 105, 155, 160, 165, 170 are not described herein, such example aspects may or may not be included in various embodiments without limiting the spirit and scope of the embodiments of the present application as would be understood by one of skill in the art. The connected devices 105, 155, 160, 165, 170 may be associated with the same user, or may be part of a trusted peer arrangement with the user. For example, the user may identify trusted devices associated with other users to facilitate the call forwarding functions described herein.

In the first device 105, the processor 115 may execute instructions stored in the memory 120 and store information in the memory 120, such as the results of the executed instructions. Some embodiments of the processor 115 and the memory 120 may be configured to implement an update manger 175 and perform portions of the method 200 shown in FIG. 2 and discussed below. For example, the processor 115 may execute the update manger 175 to automatically configure call forwarding for the device 105 during a system update. As described herein, a system update is generally any action taken by the device, such as updating the operating system, updating firmware of the device, updating an application, etc., that temporarily prevents the device 105 from accepting incoming communications. One or more aspects of the method 200 may also be implemented using a cloud computing resource 180 remote from the device 105. For example, the cloud computing resource 180 may push system update data to the device 105 when updates become available. The cloud computing resource 180 may also monitor information regarding the other connected devices 155, 160, 165, 170 such as location or availability.

Figure 2:
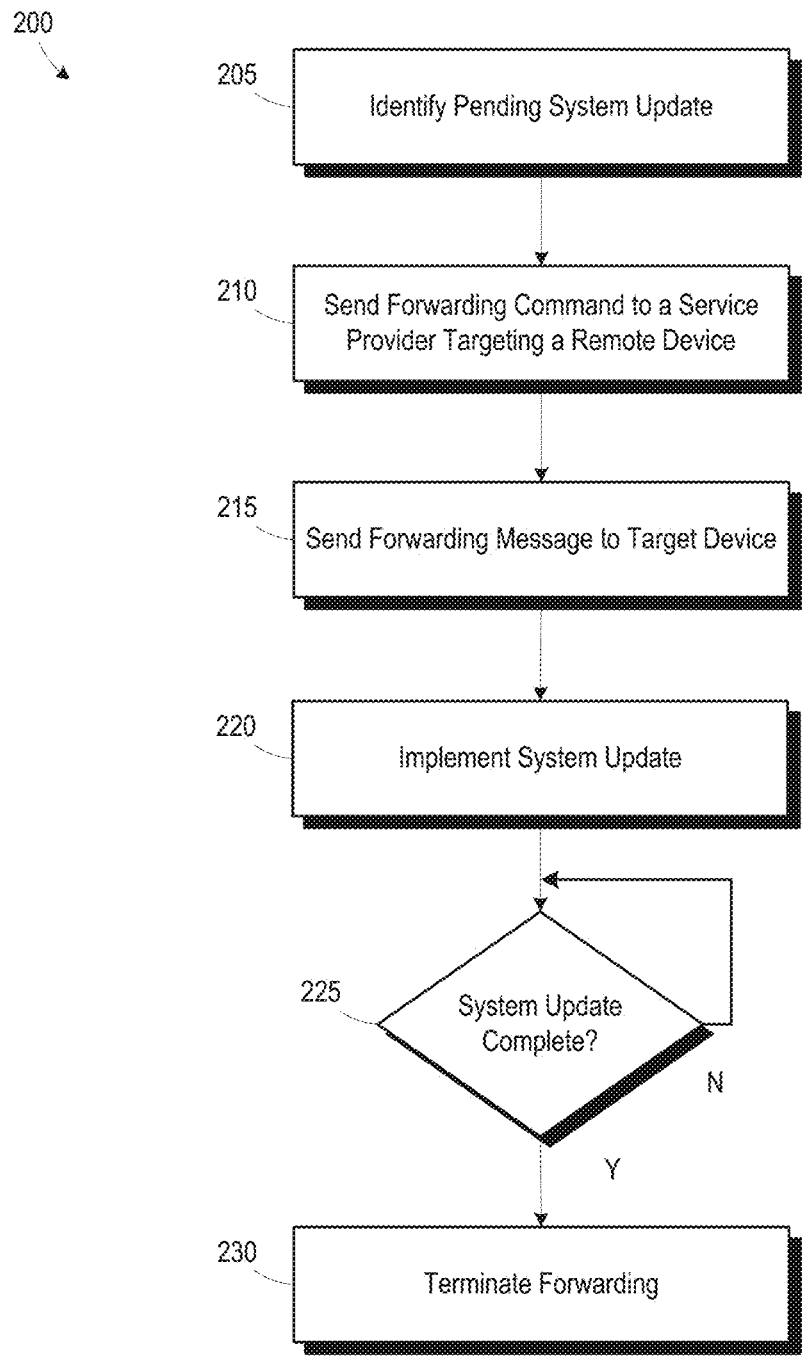
FIG. 2 is a flow diagram of a method for automatically forward calls to a device during a system update, in accordance with some embodiments.

FIG. 2 is a flow diagram of an illustrative method 200 for automatically forward communications to a device during a system update, in accordance with some embodiments disclosed herein. In general, one or more of the devices 105, 155, 160, 165, 170 may be selected as the target of a forwarding action taken by the device 105. In one example, various elements of the method 200 may be implemented on the first device 105. In some embodiments, the cloud computing resource 180 (see FIG. 1) may also be used to perform one or more elements of the method 200.

In method block 205, a pending system update is identified. For example, the cloud computing resource 180 may push the system update to the device 105. Depending on user preferences, the update manager 175 may automatically execute the system update, queue the system update until the user gives approval for the system update, or install the system update at a later time (e.g., after working hours). In some instances, the system update may temporarily prevent the device 105 from accepting incoming communications. For example, the device 105 may have to be shut down during the system update.

In method block 210, the update manager 175 sends a forwarding command from the device 105 to a service provider that provides communications services for the device 105. The forwarding command specifies a target device, such as one of the devices 155, 160, 165, 170. There are various techniques that the update manager 175 may employ to select the target for the forwarding command. In some embodiments, the update manager 175 employs a list of target devices for forwarding.

Figure 3:
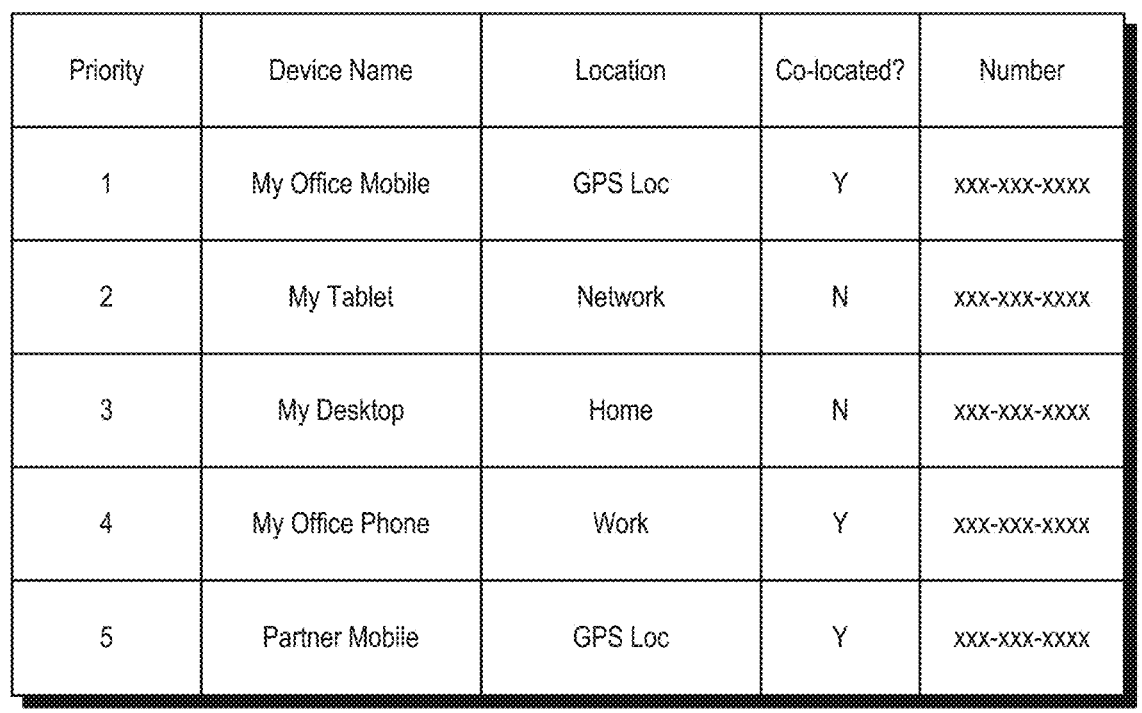
FIG. 3 is a simplified diagram of a list of target devices in tabular form, in accordance with some embodiments.

FIG. 3 is a simplified diagram of a list 300 of target devices in tabular form, in accordance with some embodiments disclosed herein. Each target device may be assigned a priority. The priority may be generated based on user preferences, usage history, etc. Some of the target devices may be associated with the same user, while others may be associated with other users, such as the entry named "Partner Mobile". In some embodiments, the update manager 175 may also track the location of the target devices so that a determination may be made if any of the target devices is co-located with the device 105. The location may be a coordinate location (e.g., a GPS location provided by the GPS module 137), a network location (e.g., the target device is connected to a particular network), a specified location (e.g., home, work, etc.), etc. In some embodiments, the target devices may communicate with the cloud computing resource 175 to register their respective locations, and the update manager 175 may poll the cloud computing resource 175 (e.g., periodically or when trying to identify a target device) to retrieve the locations. In some embodiments, the device 105 may communicate directly with the other devices. For example the device 105 may be connected by a peer network (e.g., VPN or BLUETOOTH®) connection to one or more of the candidate target devices. The device 105 may also employ the NFC module 139 to identify nearby devices. Based on the location information, the update manager 175 may determine if one or more of the target devices is co-located with the device 105.

The update manager 175 may select a particular target device based on the information available in the target device list 300. In one embodiment, the update manager 175 may simply select a default target device, such as the device with the highest priority. In another embodiment, the update manager 175 may first determine a subset of the candidate target devices representing co-located devices, and then select the co-located device having the highest priority. If no co-located devices can by located, the update manager 175 may select a default device or query the user to select a target device.

In some embodiments, the update manager 175 may not implement the target device list 300 and instead query the user for the target device prior to implementing the system update.

The particular forwarding command sent by the update manager 175 may vary based on the service provider. An example, forwarding command may be "AAbbbbbbbbbb", where "*AA" represents the forwarding activation code (e.g., "*72") and "bbbbbbbbb" represents the number of the target device. In some embodiments, the target device may have an identification name (e.g., network ID) instead of a number for forwarding.

In method block 215, the update manager 175 sends a forwarding message to the target device. This step is optional, in that some target devices may not be able to receive and display incoming messages.

In method block 220, the update manager 175 implements the system update. Any incoming communications may be routed to the target device. Incoming communications are not limited to calls, as other types of communications, such as text messages, video call requests, etc., may also be forwarded.

In method block 225, the update manager 175 determines when the system update is complete. For example, the update manager 175 may set a flag when the system update is initiated, and after a reset of the device 105, the update manager 175 may check the flag to see if an update was initiated prior to the shutdown.

In method block 230, the update manager 175 terminates the forwarding after completion of the system update. Again, the particular forwarding termination command sent by the update manager 175 may vary based on the service provider. An example, forwarding command may be "*CC", where "*CC" represents the forwarding activation code (e.g., "73")

Figure 4:
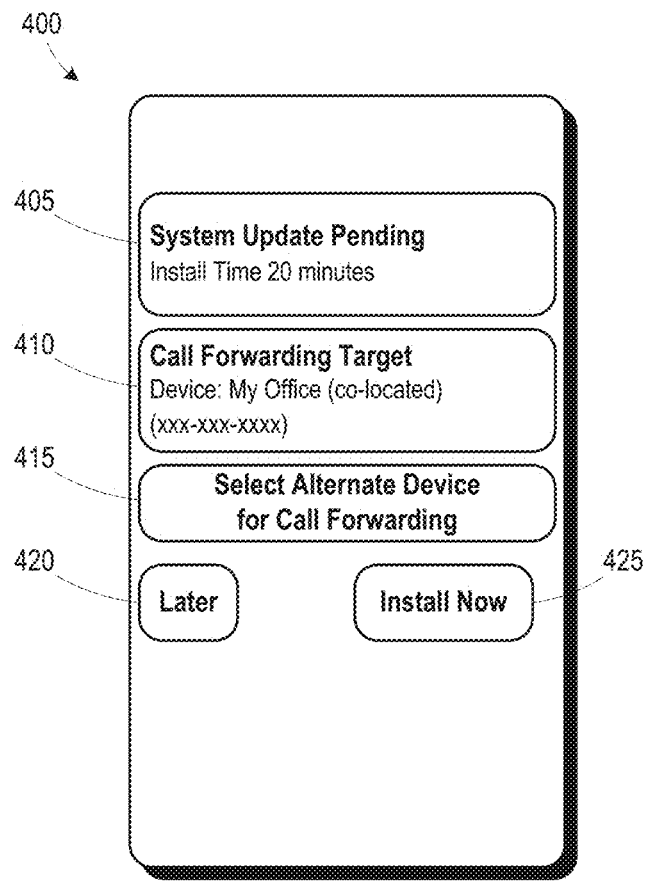
FIG. 4 is a simplified diagram of a user interface that may be provided to the user when a system update event is identified, in accordance with some embodiments.

FIG. 4 is a simplified diagram of a user interface 400 that may be provided to the user when a system update event is identified, in accordance with some embodiments disclosed herein. A notification message 405 may be provided identifying the system update and an estimated completion time. A forwarding target message 410 may be provided to inform the user of the identified target device and whether the device is co-located. Controls 415, 420, 425 may be provided to allow the user to select an alternative device for forwarding, to defer the installation of the system update until a later time, or to install the system update.

In some embodiments, certain aspects of the techniques described above may implemented by one or more processors of a processing system executing software. The method 200 described herein may be implemented by executing software on a computing device, such as the processor 115 of FIG. 1, however, such methods are not abstract in that they improve the operation of the device 105 and the user's experience when operating the device 105. Prior to execution, the software instructions may be transferred from a non-transitory computer readable storage medium to a memory, such as the memory 120 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes identifying a system update for a first device. A forwarding command is sent from the first device to a service provider that provides communications services for the first device responsive to identifying the system update. The forwarding command specifies a second device. The system update is executed after sending the forwarding command.

A first device includes a transceiver for receiving incoming communications and a processor. The processor is to identify a system update for the first device, send a forwarding command from the first device to a service provider that provides communication services for the first device responsive to identifying the system update, wherein the forwarding command specifies a second device, and execute the system update after sending the forwarding command.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method, comprising:
    identifying a system update for a first device;
    presenting a forwarding target message at the first device in response to identifying the system update;
    sending a forwarding command from the first device to a service provider that provides communications services for the first device responsive to identifying the system update, wherein the forwarding command specifies a second device for receiving communications directed to the first device; and
    executing the system update after sending the forwarding command;
    wherein the forwarding target message identifies the second device and that the communications directed to the first device will be received by the second device while the system update executes.

2. The method of claim 1, wherein the communications directed to the first device comprise one or more of voice calls, text messages, and video call requests.

3. The method of claim 2, further comprising presenting a notification message at the first device in response to identifying the system update.

4. The method of claim 3, wherein the notification message further identifies an estimated completion time for execution of the system update.

5. The method of claim 4, wherein the forwarding target message and the notification message are presented simultaneously.

6. The method of claim 4, further comprising presenting at least one control simultaneously with the forwarding target message allowing a selection of another device, different from the second device, to receive the communications directed to the first device while the system update executes.

7. The method of claim 1, the forwarding target message indicating that the communications directed to the first device will be routed to the second device while the system update executes.

8. The method of claim 1, the forwarding target message identifying the second device and providing one or more controls allowing selection of an alternate device to use as the second device.

9. The method of claim 1, further comprising sending a forwarding termination command from the first device to the service provider in response to completing executing the system update.

10. The method of claim 1, further comprising sending a forwarding notification message to the second device responsive to sending the forwarding command.

11. A first device, comprising:
    a transceiver for receiving incoming communications; and
    a processor to identify a system update for the first device, present an incoming communications forwarding target message the first device in response to identifying the system update, send an incoming communications forwarding command from the first device to a service provider that provides communication services for the first device responsive to identifying the system update, wherein the incoming communications forwarding command specifies a second device for receiving communications directed to the first device, and execute the system update after sending the incoming communications forwarding command;
    wherein the first device and the second device are different devices.

12. The device of claim 11, wherein the processor is to determine that the second device is co-located with the first device.

13. The device of claim 12, wherein the processor is to determine that the second device is co-located with the first device based on a peer connection existing between the first and second devices.

14. The device of claim 11, wherein the processor is to select the second device from a list of target devices.

15. The device of claim 14, wherein the processor is to select the second device from the list based on a location of the first device.

16. The device of claim 14, wherein the processor is to select the second device from the list based on a usage history parameter associated with the second device.

17. The device of claim 11, wherein the processor is to query a user of the first device for an identifier associated with the second device.

18. The device of claim 11, the processor presenting one or more controls at the first device concurrently with the incoming communications forwarding target message allowing a selection between deferring installation of the system update and presently installing the system update.

19. The device of claim 11, wherein the processor is to send a forwarding termination command from the first device to the service provider after executing the system update.

20. The device of claim 11, wherein the processor is to send a forwarding notification message to the second device responsive to sending the incoming communications forwarding command.

\* \* \* \* \*